United States Patent
Hsu et al.

(10) Patent No.: US 7,846,284 B2
(45) Date of Patent: Dec. 7, 2010

(54) PROCESS FOR RECYCLING SCRAP OF SHOE STIFFENER

(76) Inventors: Tsang I Hsu, No. 11, Lane 395, Shin-Sheng Road, Chiali Chen, Taiwan County (TW); Tien Ying Wu, No. 27, Lane 47, Jen-An Road, An-Nan District, Tainan (TW)

( * ) Notice: Subject to any disclaimer, the term of this patent is extended or adjusted under 35 U.S.C. 154(b) by 233 days.

(21) Appl. No.: 12/316,539

(22) Filed: Dec. 15, 2008

(65) Prior Publication Data
US 2010/0147444 A1 Jun. 17, 2010

(51) Int. Cl.
| | |
|---|---|
| *B29C 65/00* | (2006.01) |
| *B29C 73/00* | (2006.01) |
| *B29C 47/00* | (2006.01) |
| *B32B 43/00* | (2006.01) |
| *B32B 37/00* | (2006.01) |
| *B32B 38/10* | (2006.01) |

(52) U.S. Cl. ............... 156/94; 156/80; 156/154; 156/244.11

(58) Field of Classification Search ........... 156/80, 156/94, 148, 153, 154, 242, 244.11, 245
See application file for complete search history.

(56) References Cited

U.S. PATENT DOCUMENTS

| | | | | | |
|---|---|---|---|---|---|
| 5,346,934 | A | * | 9/1994 | Chriss | 524/11 |
| 5,478,865 | A | * | 12/1995 | Chang | 521/49 |
| 2002/0022428 | A1 | * | 2/2002 | Parker et al. | 442/394 |

* cited by examiner

*Primary Examiner*—Richard Crispino
*Assistant Examiner*—Brian R Slawski

(57) ABSTRACT

A process for recycling scrap of shoe stiffener comprising the steps of:
1. Kneading the collected scrap of shoe stiffener, having a core layer of TPU resin material (with filler) sandwiched in between two opposite net fabric layers, to be dense clumps;
2. Freezing the dense clumps to be hard frozen clumps;
3. Crushing the hard frozen clumps to be a crushed product including pellets of resin material, and short fibers; and
4. Extruding the crushed product including pellets and short fibers to produce a regenerated core layer; and covering or laminating two net fabric layers on opposite sides of the regenerated core layer to obtain a regenerated shoe stiffener sheet to enhance environmental protection and prevent from wasting of material resources.

2 Claims, 1 Drawing Sheet

PROCESS FOR RECYCLING SCRAP OF SHOE STIFFENER

BACKGROUND OF THE INVENTION

A conventional shoe stiffener as shown in FIG. 1 comprises a core layer 1 consisting of a main resin material of thermoplastic polyurethane and a filler selected from polycarbonate, polyacrylic, polystyrene or other resin materials having high melting point and hardness, an upper and a lower reinforcing net fabric layer 2, 3 disposed on opposite sides of the core layer 2 for sandwiching the core layer 1 in between the upper and lower reinforcing net fabric layers 2, 3 which are made of cotton, nylon, or T/C (Polyethylene Terephthalate/Cotton) fabric.

Such a shoe stiffener is formed as a thin sheet as extruded through a T-die of an extruder to have a dimension of 0.4 mm~2.0 mm (thickness)×1~1.5 m (length)×1 m (width), which is then cut into desired shape or size for making a shoe stiffener such as a toe stiffener or a counter stiffener. Since the stiffener shapes are different from one another, much waste or scrap of the shoe stiffener will be produced, which ranges from 10~20% based on the raw material of the total stiffener.

The stiffener scrap contains long filaments existing in the reinforcing net fabric layers (2, 3), which are difficult to be separated from the resin materials of polyurethane and the filler. So, the scrap is traditionally disposed for incineration or for underground disposal, to thereby cause big problem of environmental protection and thereby waste material resources.

It is therefore expected to disclose a process for efficiently recycling the stiffener scrap for environmental protection and economic re-use of materials.

SUMMARY OF THE INVENTION

The object of the present invention is to provide a process for recycling scrap of shoe stiffener comprising the steps of:
1. Kneading the collected scrap of shoe stiffener, having a core layer of TPU resin material (with filler) sandwiched in between two opposite net fabric layers, to be a plurality of dense clumps of kneaded scrap;
2. Freezing the dense clumps of kneaded scrap at temperature of 0° C.~−20° C. to be hard frozen clumps;
3. Crushing the hard frozen clumps to be a crushed product including pellets of resin material, and short fibers; and
4. Extruding the crushed product including pellets and short fibers through a T-die of an extruder to produce a regenerated core layer for shoe stiffener; and covering or laminating two net fabric layers on opposite sides of the regenerated core layer to obtain a regenerated shoe stiffener sheet to thereby enhance environmental protection and prevent from wasting of material resources.

DETAILED DESCRIPTION

Figure 1:
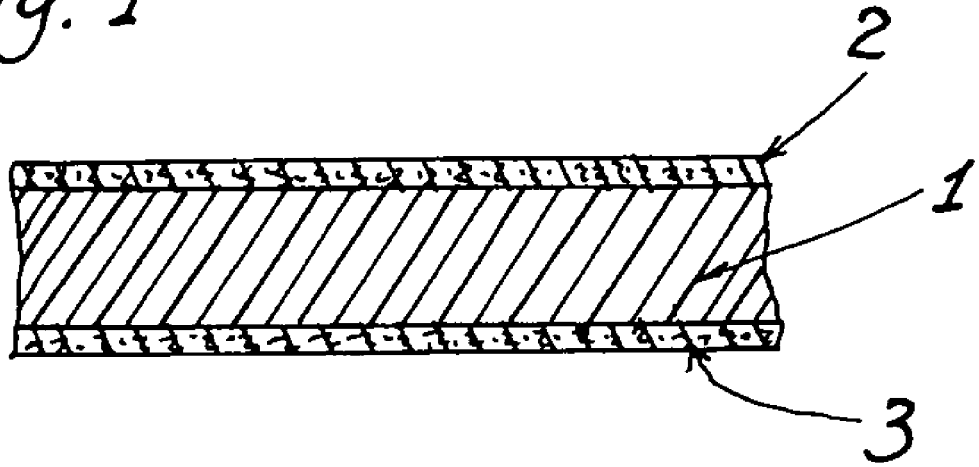
FIG. 1 is a sectional drawing showing a conventional shoe stiffener sheet.

The present invention discloses a process for recycling the scrap or waste of a shoe stiffener sheet which is composed of a core layer 1, an upper reinforcing net fabric layer 2 and a lower reinforcing net fabric layer 3 disposed on two opposite sides (or a top and a bottom side) of the core layer 1.

The core layer 1 may be a composition (100% by weight) consisting of a thermoplastic polyurethane (TPU) resin material (50~80% by weight) and a filler (20~50% by weight) selected from polycarbonate, polyacrylic, polystyrene, and the other resin materials of high melting point and high hardness.

The upper and lower reinforcing net fabric layers 2, 3 are disposed on two opposite sides of the core layer 1 to form a multiple-layer shoe stiffener sheet. In other words, the core layer 1 is sandwiched in between the upper and lower net fabric layers 2, 3.

Each reinforcing net fabric layer 2 or 3 may be made of cotton, Nylon, T/C (Polyethylene Terephthalate/Cotton) fabric or other fibrous materials, having long filaments presented in the fabric layer.

The net fabric layer 2 or 3 may be woven or non-woven fabric layer having a plurality of net or mesh apertures formed therein.

Such a net fabric layer 2 or 3, when covered on the core layer 1 may be bonded or adhered with the resinous materials (TPU) in the core layer 1. Therefore, the two net fabric layers 2, 3 are each overlaid or covered on a top or a bottom surface of the core layer 1 at a temperature higher than the melting point (above 60° C.) of TPU to melt the TPU resin to be tacky for adhering the TPU resin in the core layer 1 with either the upper net fabric layer 2 or the lower net fabric layer 3 to thereby form a well boned triple-layer shoe stiffener sheet as shown in FIG. 2, in which the core layer 1 has been incorporated therein with short fibers 4 as a reinforcing fibrous material, which will be described in detail hereinafter.

The process of the present invention comprises the steps of:
1. Collecting scrap of shoe stiffener and removing any unexpected matters or dirts in the scrap;
2. Kneading the scrap as collected by a kneader at a temperature of 60° C.~150° C., which is higher than the melting point (about 60° C.) of thermoplastic polyurethane (TPU), and then compressing under cooling the bulk or loose scrap to be a plurality of dense clumps each having an average diameter of 30~50 centimeters (having irregular shapes);
3. Freezing the dense clumps at a low temperature ranging 0° C.~−20° C. in a freezing chamber (or room) to be frozen clumps each being hard but brittle at such a low temperature;
4. Crushing the frozen clumps to be a crushed product including pellets of resin materials each pellet having a diameter of 0.1~1 cm, and short fibers each fiber having a length less than 1 cm as being cut from long filaments existing in the original upper and lower net fabric layers; and
5. Extruding the crushed product through a T-die of an extruder at temperature of 100~130° C. to form a regenerated core layer; and laminating two reinforcing net fabric layers on opposite sides of the regenerated core layer to produce a regenerated shoe stiffener sheet having the core layer sandwiched in between the upper and lower reinforcing net fabric layers.

Figure 2:
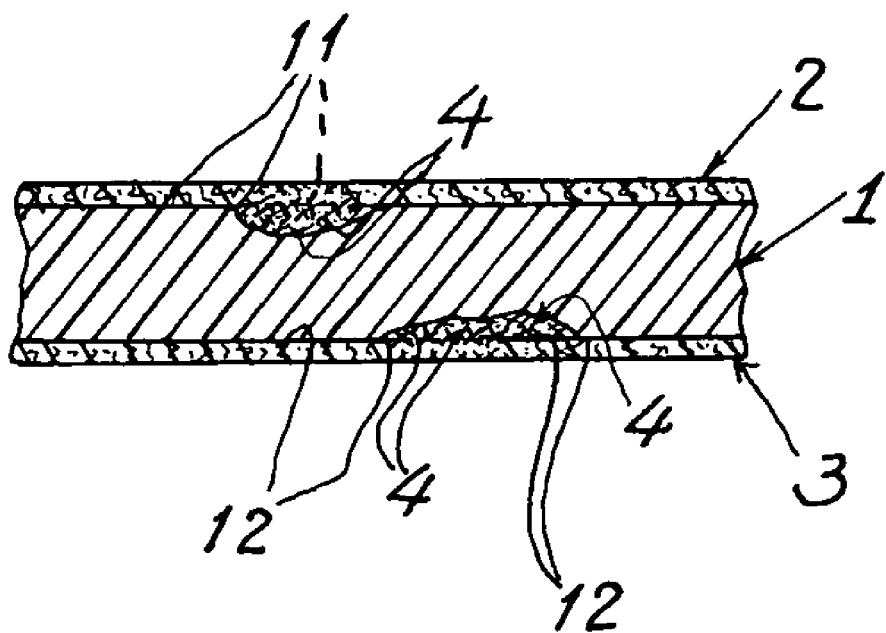
FIG. 2 is a sectional drawing of a shoe stiffener sheet as made in accordance with the present invention.

As shown in FIG. 2, along each interface 11 (or interface 12) between the upper layer 2 (or the lower layer 3) and the core layer 1 consisting of the thermoplastic polyurethane (TPU) and short fibers 4 as cut from long filaments contained in original reinforcing net fabric layer 2 or 3, each short fiber 4 as impregnated or encapsulated with TPU in the core layer 1 will be "interlocked" with the fibrous material in the net fabric layer 2, 3 (like a "cross-linking" in polymer chemistry), especially when pressed as passing through at least a pair of cooling rollers (not shown) provided at downstream of the extruder, to thereby firmly fasten and laminate the upper and lower reinforcing net fabric layers 2, 3 on opposite sides of the core layer 1.

Such an "interlocking mechanism" between either fabric layer 2 or 3 with the core layer 1 will enhance a more stable fastening of the upper or lower reinforcing net fabric layer 2, 3 with the core layer 1 as taught by the present invention as shown in FIG. 2 than the prior art as shown in FIG. 1, wherein the interface between either net fabric layer 2 or 3 with the core layer 3 of the prior art is lacking of any "interlocking mechanism" as taught by this invention.

Therefore, the present invention provides a process with plural advantages, not only for recycling the scrap of shoe stiffeners for re-use of the scrap and for better environmental protection; but also for enhancing the multiple-layer construction of the shoe stiffener sheet due to the interlocking mechanism as aforementioned for preventing delamination of the multiple-layer stiffener for enhancing better product quality of the shoe stiffener.

As aforementioned, the present invention may only include the four steps, namely, Step 1 through Step 4, by eliminating the final step (or Step 5), to therefore produce crushed product including pellets of resin materials (TPU and filler) and short fibers, which may be blended with a "fresh" feed (containing no regenerated material as taught by this invention) to be combinably fed into an extruder for producing a shoe stiffener sheet containing a portion, e.g., 20~50% (but not limited), of the regenerated material of this invention based on the total stiffener.

In above-mentioned Step 3 for freezing the dense clumps at low temperature of 0° C.~−20° C., the frozen clumps including TPU resin material will become brittle at such a low temperature and will thus be easily crushed in the following or subsequent step, namely the Step 4. Meanwhile, the low-temperature of the frozen clumps may also cool the crushing knife or blade to lower its operating temperature in order to maintain the process operation smoothly.

In Step 5 as above-mentioned, the short fibers as obtained from original upper or lower net fabric layer 2 or 3 will be impregnated, saturated or encapsulated by the resin material such as TPU in the core layer 1 to form a composite consisting of the matrix of resin material (TPU) and the reinforcing fibers 4 especially when extruded through the T-die at a temperature of 100~130° C. which is higher than the melting point of TPU (60° C.). So, the core layer 1 is now becoming a "composite" layer having fibers 4 reinforced therein (FIG. 2).

Synergetically, at each interface 11 or 12 between the core layer 1 and each net fabric layer 2 or 3, there is an "interlocking mechanism" formed along the interface to mutually interlock the resin-encapsulated fibers 4 in the core layer 1 with the fibrous material in the net fabric layer 2 or 3 to firmly fasten the upper and lower layers 2, 3 with the core layer 1 to prevent from de-lamination thereof.

The present invention may be further modified without departing from the spirit and scope of the present invention.

We claim:

1. A process for recycling scrap of shoe stiffener consisting of a core layer with thermoplastic polyurethane and filler resin materials, an upper and a lower reinforcing net fabric layer having long filaments contained therein and disposed on opposite sides of said core layer, said process comprising the steps of:
   (1) Kneading scrap of shoe stiffener, as collected, by a kneader at a temperature of 60° C.~150° C. and compressing, under cooling, the scrap to be a plurality of dense clumps;
   (2) Freezing the dense clumps at a low temperature ranging 0° C.~−20° C. to be frozen clumps which are hard and brittle at the low temperature;
   (3) Crushing the frozen clumps to be a crushed product including pellets of resin materials and short fibers as being cut from the long filaments contained in the upper and low net fabric layers; and
   (4) Extruding the crushed product through a T-die of an extender to form a regenerated core layer, and laminating two reinforcing net fabric layers on opposite sides of the regenerated core layer to produce a regenerated shoe stiffener sheet having the core layer sandwiched in between the upper and lower reinforcing net fabric layers.

2. A process for recycling scrap of shoe stiffener consisting of a core layer with thermoplastic polyurethane and filler resin material, an upper and a lower reinforcing net fabric layer having long filaments contained therein and disposed on opposite sides of said core layer, said process comprising the steps of:
   (1) Kneading scrap of shoe stiffener, as collected, by a kneader at a temperature of 60° C.~150° C. and compressing, under cooling, the scrap to be a plurality of dense clumps;
   (2) Freezing the dense clumps at a low temperature ranging 0° C.~−20° C. to be frozen clumps which are hard and brittle at the low temperature; and
   (3) Crushing the frozen clumps to be a crushed product including pellets of resin materials and short fibers as being cut from the long filaments contained in the upper and low net fabric layers.

\* \* \* \* \*